E. A. SMITH.
BEET PULLER.
APPLICATION FILED NOV. 27, 1908.
933,352.
Patented Sept. 7, 1909.
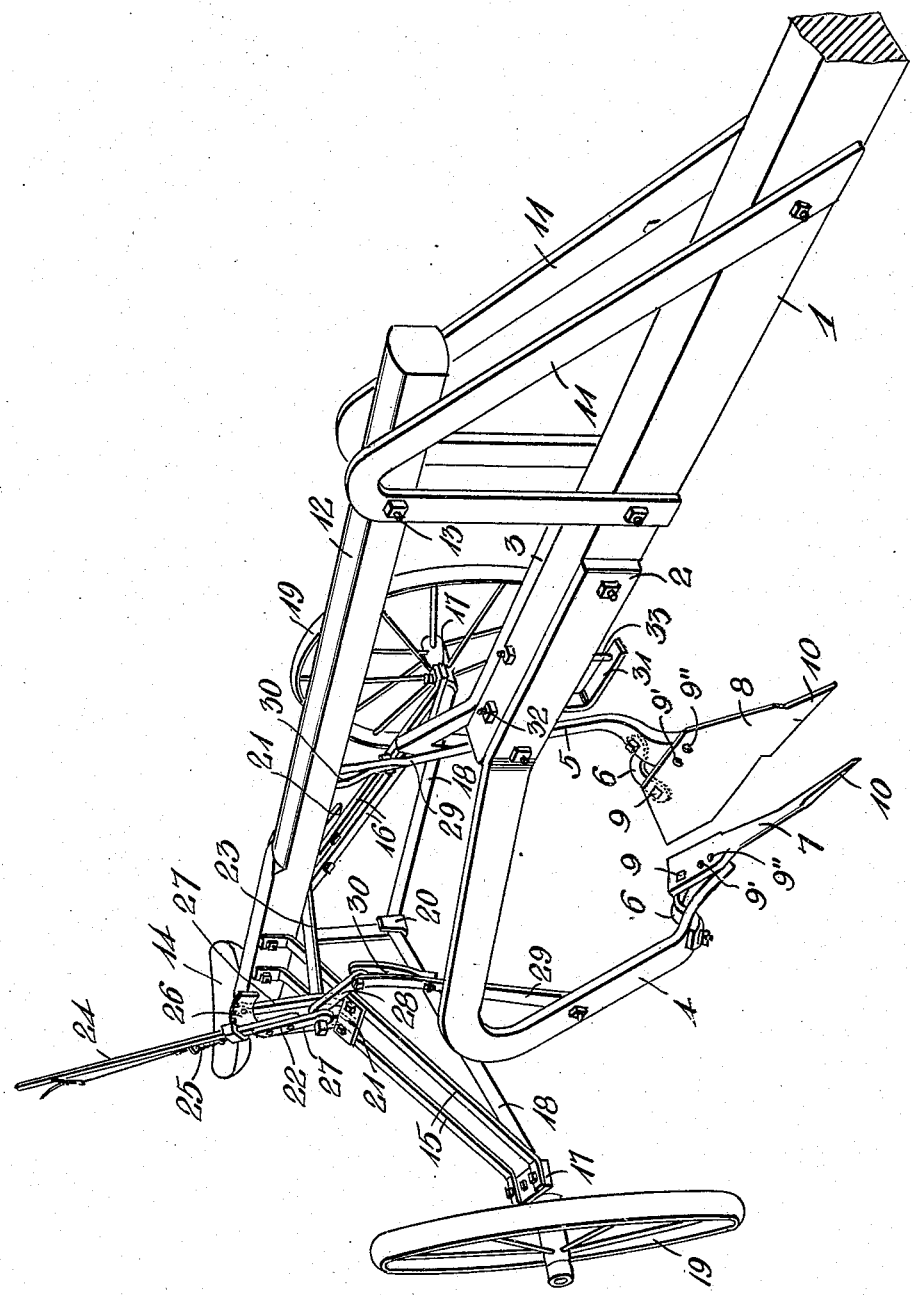
Witnesses
L. O. Hilton
Inventor
Edward A. Smith
By H. B. Willson & Co.
Attorneys

UNITED STATES PATENT OFFICE.

EDWARD A. SMITH, OF FORT MORGAN, COLORADO, ASSIGNOR OF ONE-THIRD TO EDWARD B. SMITH, OF LOVELAND, COLORADO, AND ONE-THIRD TO MURRY M. ST. CLAIRE, OF FORT COLLINS, COLORADO.

BEET-PULLER.

933,352.      Specification of Letters Patent.      Patented Sept. 7, 1909.

Application filed November 27, 1908. Serial No. 464,712.

*To all whom it may concern:*

Be it known that I, EDWARD A. SMITH, a citizen of the United States, residing at Fort Morgan, in the county of Morgan and State of Colorado, have invented certain new and useful Improvements in Beet-Pullers; and I do declare the following to be a full, clear, and exact description of the invention, such as will enable others skilled in the art to which it appertains to make and use the same.

This invention relates to improvements in beet pullers, and has for its object the production of a simple beet puller mounted upon a wheeled frame and provided with means whereby the beet-engaging blades may be raised or lowered.

One of the objects of the invention is the production of a simple wheeled beet puller having a strong and efficient frame and mechanism whereby the beet-engaging blades carried by the frame may be readily elevated from the ground when the puller is in motion.

With this and other objects in view, the invention consists of certain novel features of construction, combination and arrangement of parts as will be described and particularly pointed out in the appended claims.

In the accompanying drawing, the figure is a perspective view of my improved beet puller.

In the accompanying drawings, 1 denotes a tongue which is provided at its inner end with rearwardly extending beams, 2 and 3, which are rigidly secured to the opposite sides of said tongue and which are formed with downwardly extending blade supporting portions, 4 and 5, the ends of which are slightly twisted and have connected thereto the blade braces, 6. A pair of beet engaging blades, 7 and 8, are secured to the portions, 4 and 5, and to the braces by bolts 9′, 9″ and 9, respectively. The blades, 7 and 8, are preferably provided as shown with outwardly extending points, 10, which may be detachably secured thereto or formed thereon, as shown.

The tongue, 1, is provided with arched braces, 11, the rear ends of which are disposed in a vertical plane, and the forward ends of which are disposed at an oblique angle. The braces 11 are arranged on opposite sides of the tongue, 1, and a horizontally disposed and rearwardly extending beam, 12, is pivotally connected at 13 to the braces, 11, said braces being arranged on opposite sides of said beam. The horizontally disposed beam, 12, carries on its rear end a seat, 14, and is connected to angularly disposed braces, 15 and 16, which have their lower ends secured by means of blocks, 17, to an angularly formed axle 18, which carries on its outer ends traction wheels, 19. The axle, 18, is preferably arched and is connected by means of a vertically disposed brace bearing, 20, with the rear end of the horizontally disposed beam, 12. The angularly disposed braces, 15 and 16, are provided with cross bars, 21, which are bolted thereto, and a bearing block, 22, is secured to each set of said braces. A shaft, 23, is supported on the bearing blocks, 22, and one end of said shaft is squared, and a lever, 24, which is provided with a manually-operated clutch pawl, 25, is mounted on said squared end. The pawl, 25, engages with a segmental rack, 26, which is supported on a vertically disposed bar, 27, the lower end of said bar being secured to the brace, 15. The outer ends of the shaft, 23, are provided with forwardly extending links, 28, which connect at their forward ends with downwardly-extending links, 29, which are pivotally connected to the ends 4 and 5 of the beams, 2 and 3, said links being provided with reinforcing bars, 30.

The rear portions of the beams, 2 and 3, are preferably extended apart, and the beet-engaging blades, 7 and 8, are so arranged on the lower ends of said beams as to form a substantially V-shaped opening between said blades. When the puller is driven over a field, the blades 7 and 8 are placed in engagement with the ground and on opposite sides of a row of beets, so that said blades will be in a position to grasp the top of the beets and remove the same from the ground. When it is desired to elevate the beet engaging blades, 7 and 8, from the ground, the lever, 24, is pulled rearwardly, thereby tilting the forwardly-extending links, 28, in an upward direction, and raising the downwardly-extending links, 29. The rear end of the tongue 1 is preferably provided with a hammer strap, 31, which is secured at 32 to said beam, and a pin bolt, 33, which is connected to the hammer strap, 31. The hammer strap, 31, and pin bolt, 33, provide means for securing a double tree to the tongue.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A beet puller of the class described, comprising a tongue provided at its rear end with beams carrying on their lower ends beet-engaging blades, angularly disposed braces connected to opposite sides of the tongue, a rearwardly extending supporting beam pivotally connected to the braces, braces secured to the rear end of the beam, an axle carrying wheels mounted on the ends of said braces, and means arranged on the braces for elevating the beet-engaging blades.

2. In a beet puller of the class described, a tongue provided at its rear end with beams carrying beet-engaging blades at their lower ends, upwardly extending braces secured to the tongue, a horizontally disposed and rearwardly extending beam pivotally secured to the braces, a seat arranged on the rear end of said beam, braces extending in opposite directions secured to the rear end of said beam, an axle provided at its outer ends with wheels and rigidly secured to the lower ends of the braces, a segment mounted on a part of said braces, a shaft supported on said braces, links connected to the shaft pivotally connected to the beams, and a manually operated lever mounted on the shaft.

3. In a beet puller of the class described, a tongue provided at its rear end with oppositely extending beams carrying beet engaging blades at their lower ends, braces secured to the opposite sides of said tongue, a seat beam pivotally connected to the braces, an axle braced to the rear end of said seat beam, links pivotally connected to the beams, a shaft extending across the seat beam and connected to the links, and means for rotating the shaft.

In testimony whereof I have hereunto set my hand in presence of two subscribing witnesses.

EDWARD A. SMITH.

Witnesses:
ROBERT M. WORK,
B. W. JACKSON.